P. GRAY.
CASTING GUN.
APPLICATION FILED SEPT. 15, 1911.
1,054,916.
Patented Mar. 4, 1913.
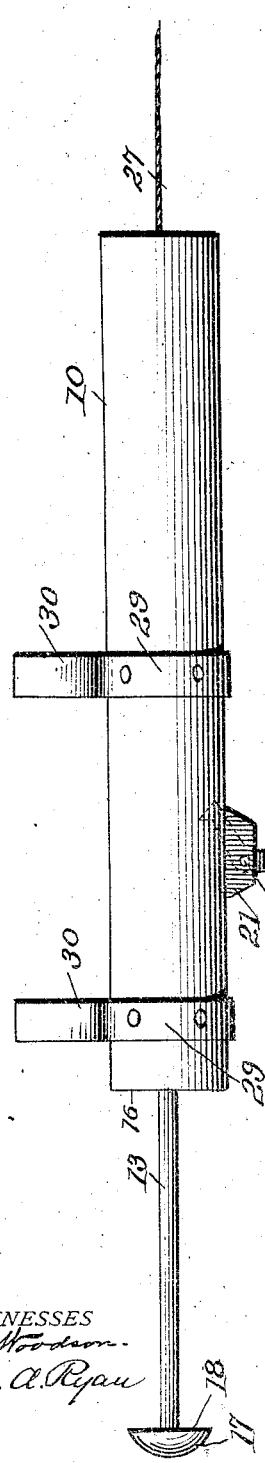
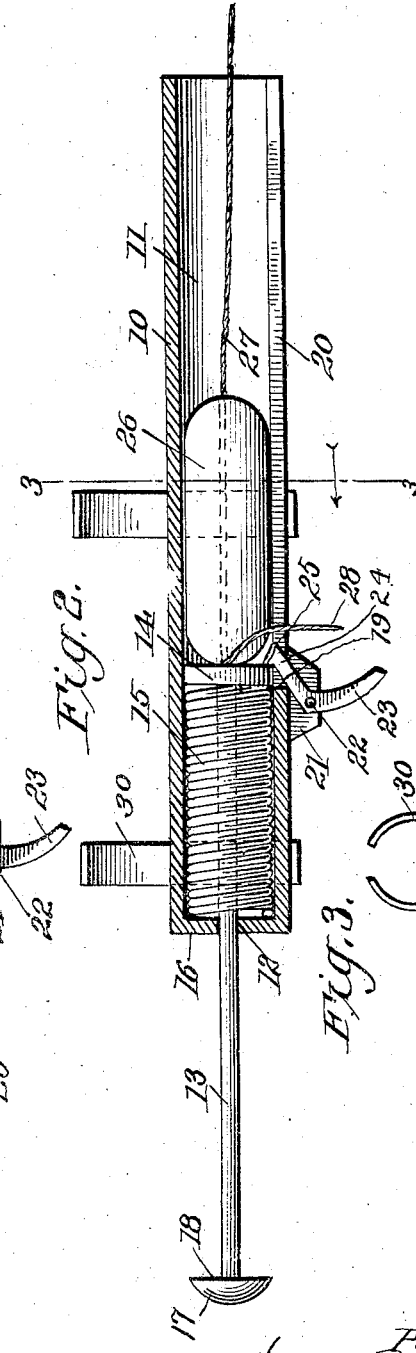
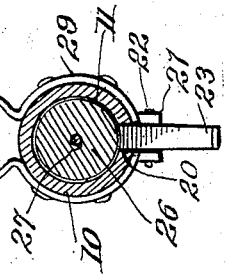
WITNESSES
INVENTOR
Palmer Gray
Attorneys.

UNITED STATES PATENT OFFICE.

PALMER GRAY, OF JEFFERSONVILLE, INDIANA.

CASTING-GUN.

1,054,916.　　　Specification of Letters Patent.　　Patented Mar. 4, 1913.

Application filed September 15, 1911. Serial No. 649,586.

*To all whom it may concern:*

Be it known that I, PALMER GRAY, a citizen of the United States, residing at No. 735 Spring street, Jeffersonville, in the county of Clark and State of Indiana, have invented a new and useful Casting-Gun, of which the following is a specification.

This invention relates to an improvement in casting devices for fishing lines.

The primary object of the invention is to provide a casting gun which may be attached to a fishing rod and which receives the sinker attached to the line and projects the same upon the operation of a releasing mechanism.

A further object of the invention is to provide a projecting mechanism which may be readily set by the insertion of the sinker, the construction being such that it may be conveniently carried on a fishing rod without materially adding to the weight of the rod or interfering with the use of the rod.

In the drawings: Figure 1 is a side elevation; Fig. 2 a longitudinal section; and Fig. 3 a section taken on the line 3—3 of Fig. 2.

In the drawings 10 designates a casing or barrel the bore 11 of which is of a diameter slightly greater than that of the usual fishing line sinker. One end of the barrel is closed, the closed end being provided with an opening 12 through which a plunger 13 extends. The plunger is provided on its terminal which is housed within the barrel with a head 14, a coil spring 15 being interposed between said head and the end wall 16 of the barrel. The terminal of the plunger remote from the head 14 is provided with a button or stop 17, the face 18 of which abuts the outer face of the end wall 16 of the casing when the spring is extended.

The barrel is slotted from its open end to a point adjacent its closed end 12, the distance between the terminal 19 of the slot 20 and the end wall 12 being consistent with the length of the spring 15 when it is compressed. A plurality of lugs 21 are secured to or formed integral with the casing, there being a lug disposed on either side of the slot 20 adjacent its terminal. These lugs are apertured to receive a pivot pin 22 on which is pivotally mounted a trigger 23.

The portion 24 of the trigger is disposed to extend within the barrel, being provided with a shoulder 25 which, when the plunger is drawn to the position shown in Fig. 2 to compress the spring 15, engages the outer face of the head 14, preventing the return movement of the plunger.

The spring is compressed by means of the sinker 26 which is secured to the line 27. The sinker is inserted within the barrel in a vertical position—that is, with the closed end down—the sinker either being of sufficient weight or forced within the barrel to such an extent to engage the head 14 of the plunger to compress the spring 15 where it may be engaged by the trigger.

The sinker is placed intermediate the ends of the line and the portion 28 of the line passes within the slot 20.

The barrel is secured to the fishing rod by means of clips 29 which are secured to the barrel and provided with the resilient fingers 30 which engage the rod. It will be noted by this construction that the barrel may be readily positioned on the rod, the arrangement being such that the operation of the device in no way affects the use of the rod. Attention is also called to the fact that the construction is such as may be easily and economically manufactured and that the various parts may be readily assembled.

What I claim is:

1. A casting gun for fishing lines comprising a barrel, one end of which is open, there being a slot arranged in the barrel, the slot extending to a point adjacent the closed end of the barrel, a plunger arranged within the barrel, said plunger being provided with a head, resilient means for normally maintaining the head adjacent the open end of the barrel, and means for maintaining the head at a point adjacent the closed end of the barrel.

2. A casting gun for fishing lines comprising a barrel, a plunger disposed within the barrel, said plunger being provided with a head, the barrel being formed with a closed end through which the plunger extends, a coiled spring interposed between the head and the closed end of the barrel, a stop arranged on the terminal of the plunger remote from the head and disposed to contact with the outer face of the end wall of the barrel, the barrel being slotted from its open end to a point adjacent its closed end, and a trigger pivotally supported by the barrel and arranged to extend within the barrel and engage the head of the plunger to maintain the spring compressed between the head and the end wall.

PALMER GRAY.

Witnesses:
 FRY L. CURRY,
 S. G. WILKINSON.